United States Patent
Kim et al.

(10) Patent No.: US 8,351,746 B2
(45) Date of Patent: Jan. 8, 2013

(54) OPTICAL FIBER CABLE WITH IMPROVED WATERPROOF PERFORMANCE

(75) Inventors: Tae Gyoung Kim, Busan (KR); Son Min, Gumi-si (KR)

(73) Assignee: LS Cable & System Ltd., Anyang-si, Gyeonggi-do (KR)

(*) Notice: Subject to any disclaimer, the term of this patent is extended or adjusted under 35 U.S.C. 154(b) by 344 days.

(21) Appl. No.: 12/844,912

(22) Filed: Jul. 28, 2010

(65) Prior Publication Data

US 2011/0081122 A1    Apr. 7, 2011

(30) Foreign Application Priority Data

Oct. 1, 2009    (KR) .................. 10-2009-0093858

(51) Int. Cl.
*G02B 6/44*    (2006.01)
(52) U.S. Cl. .................. 385/100; 385/105; 385/109
(58) Field of Classification Search .................. None
See application file for complete search history.

(56) References Cited

U.S. PATENT DOCUMENTS

| 6,788,858 | B1* | 9/2004 | Park et al. | 385/109 |
| 2006/0104580 | A1* | 5/2006 | Um et al. | 385/113 |
| 2009/0016687 | A1* | 1/2009 | Kang et al. | 385/128 |

* cited by examiner

*Primary Examiner* — Tina Wong
(74) *Attorney, Agent, or Firm* — Sherr & Jiang, PLLC

(57) ABSTRACT

The present invention relates to an optical fiber cable with improved waterproof performance comprising: at least one tensile members; optical fiber units including at least one optical fiber cores; at least one buffer tube surrounding the optical fiber units; sheath covering the buffer tube and the tensile member to form a outer jacket of the cable, wherein a waterproof yarn is inserted longitudinally in the buffer tube with the optical fiber unit, and the thickness of the waterproof yarn is from 300 to 3,000 deniers, and tensile strength of the waterproof yarn is from 3 N to 150 N, and elongation rate of the waterproof yarn is from 5% to 45%, and water absorption rate of the waterproof yarn is at least 20 g/g.
By the optical fiber cable, improve waterproof performance can be improved, and by minimizing the tensile strength of the waterproof yarn, possibility of break can be reduced.

10 Claims, 1 Drawing Sheet

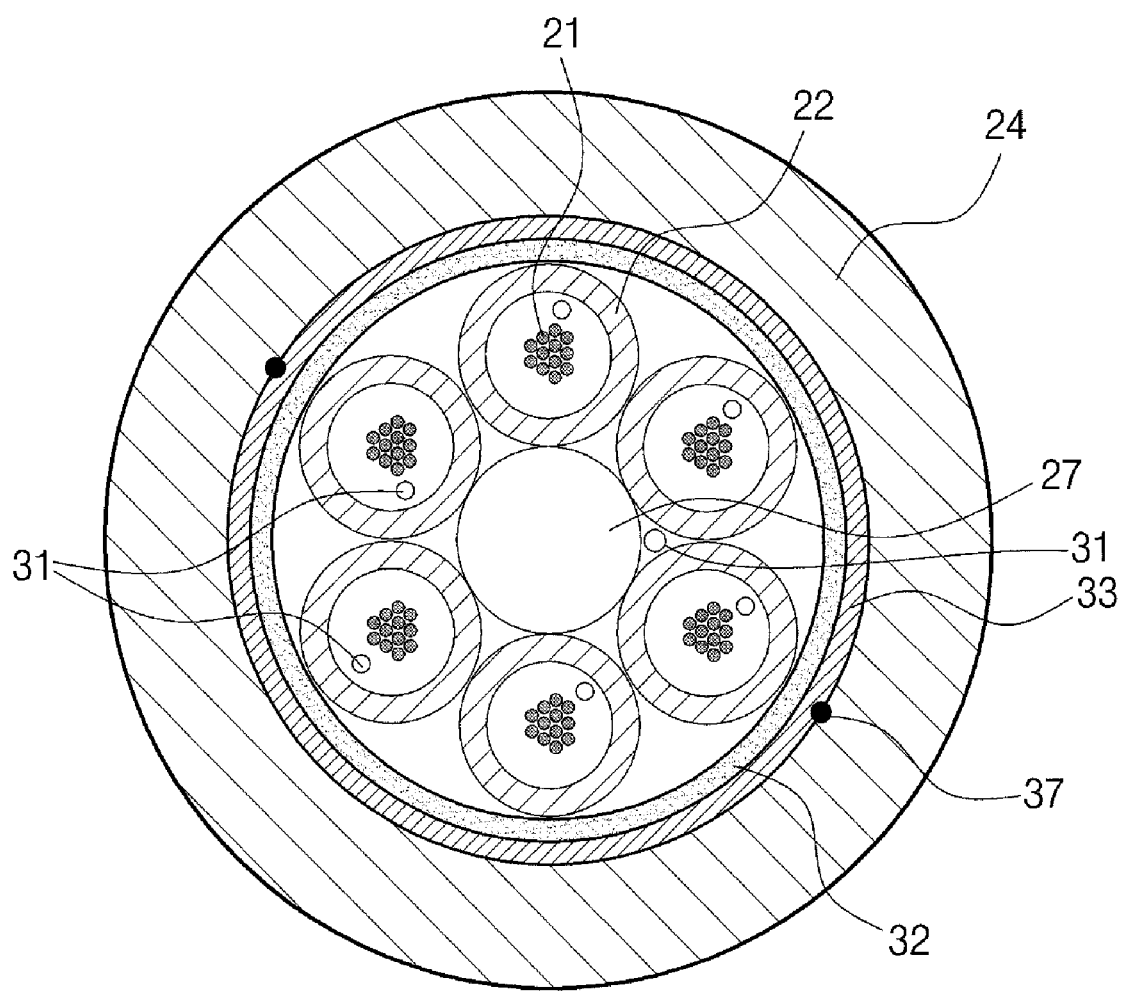

OPTICAL FIBER CABLE WITH IMPROVED WATERPROOF PERFORMANCE

CROSS REFERENCE TO PRIOR APPLICATIONS

This application claims priority to Korean Patent Application No. 10-2009-0093858 (filed on Oct. 1, 2009), which is hereby incorporated by reference in its entirety.

TECHNICAL FIELD

The present invention relates to an optical fiber cable with improved waterproof performance, whose waterproof reliability is improved by minimizing the tensile stress in waterproof yarn by restricting the thickness, tensile strength, elongation and shrinkage rate to minimize the possibility of break.

BACKGROUND ART

The demand for optical fiber cable is increasing according to the implementation of diversified communication services, such as bidirectional communication and video call, and increase of LAN service.

Due to their high communication performance, the demand for optical fiber cable is increasing sharply to meet the increase of such communication services.

The typical optical fiber cable comprises one or more optical fiber units having one or more optical fiber cores and buffer tube or tubes covering the cores, and the optical fiber units are covered with outer sheath.

Since optical fiber cables are usually installed in wet environment, for example, underground pit or the sea-bed, they must be protected from the moisture or water to maintain the communication functionality.

The typical waterproof methods for optical fiber cable can be classified into three categories.

The three methods are inserting jelly compound in the optical fiber cable, inserting waterproof powder in the tube, and applying water-blocking tape containing waterproofing material.

The first method, inserting jelly compound in the cable, has the inconvenience of removing the jelly using special detergent or alcohol when the cable is cut off for branch joint, and contamination of environment may be occurred by the jelly material.

The method of applying water-blocking tape is difficult to be implemented, because the process of inserting water-blocking tape into the tube is not simple.

And, the method using waterproof powder has a matter that waterproof power is liable to be weakened over a long period, because the waterproof powder in the cable may move in the cable.

To solve these problems, the method of applying waterproof yarn containing waterproof material in cable is suggested.

In this method, a certain quantity of the waterproof yarn is applied in optical fiber cable to absorb the moisture penetrated into the tube.

In the waterproof yarn, waterproof powder is applied which absorbs the moisture in cable.

The waterproof yarn can be wound on the buffer tube or sheath, or laid longitudinally into the buffer tube.

The waterproof yarn may be broken by tensile stress in the process of application in the buffer tube or by cable bending, for example, during cable laying or winding on a cable drum, and that can lead to deterioration of waterproof performance.

In addition, the thermal expansion or shrinkage of the waterproof yarn may cause interference of the waterproof yarn with the optical fiber unit and that can cause optical loss.

DISCLOSURE

[Technical Problem]

To solve above mentioned problems, the purpose of the present invention is to provide an optical fiber cable with improved waterproof performance, with less possibility of breaking of the waterproof yarn by minimizing tensile stress which can be generated in the waterproof yarn in the course of manufacturing or laying work, by controlling ranges of thickness, tensile strength and elongation of the waterproof yarn which is inserted longitudinally into the buffer tube.

In addition, another purpose of the present invention is to provide an optical fiber cable with improved waterproof performance with preventing optical loss, by setting a limit on the elongation or shrinkage rate of the waterproof yarn by change of temperature to eliminate interference of the waterproof yarn with the optical fiber unit.

[Technical Solution]

The optical fiber cable according to the present invention comprises one or more tensile members, one or more optical fiber units having one or more optical fiber cores, one or more buffer tubes covering the optical fiber unit, and sheath which covers the buffer tube or tubes and the tensile member or members to form the outer jacket of cable. The buffer tube or tubes have waterproof yarn in addition to the optical fiber unit. The thickness, tensile strength, elongation, and water absorption of the waterproof yarn are 300~3,000 denier, 3~150N, 5~25%, and 20 g/g or above, respectively.

Preferably, the shrinkage rate of said waterproof yarn is 15% or less.

The waterproof yarn can be produced by applying waterproof powder on yarn, or processing waterproof powder into threads and twisting them with yarn. The waterproof powder can be polyacrylic acid salts, PVA maleic reagent, isobutylene maleic copolymer, polyacrylonitrile copolymer, polyethylene oxide vulcanizates, starch-acrylonitrile copolymer, or starch-acrylic acid graft copolymer.

In addition, the optical fiber cable according to the present invention can further include glass fiber in the sheath.

In addition, the central tensile member can be further applied with waterproof yarn on the outer surface.

Preferably, water-blocking tape further wrapping the buffer tube or tubes can be applied.

In addition, the optical fiber cable according to the present invention can further include a metal jacket inside the sheath.

In addition, the metal jacket can be further applied with waterproof yarn on the outer surface.

Preferably, the sheath is divided into the inner and outer sheath parts which can further have additional waterproof yarn between them.

Preferably, reinforcing tape can be further applied between the inner and outer sheaths.

[Advantageous Effects]

Due to the structure and materials described hereinabove, the present invention provides an optical fiber cable with improved waterproof performance, with less possibility of core breaking by minimizing the tensile stress which can be generated in the waterproof yarn in the course of manufacturing or laying work, which can be implemented by controlling the ranges of thickness, tensile strength and elongation of optical fiber cable. In addition, optical loss in the cable can be reduced by preventing the interference of the thermal expansion or shrinkage of the waterproof yarn with the optical fiber unit which can be implemented by limiting the shrinkage rate of the waterproof yarn.

DESCRIPTION OF DRAWINGS

The drawings attached illustrating the preferable embodiment of the present invention only helps further understanding of the idea of the present invention along with the detailed description of the present invention described in the below, and thus the present invention is not limitedly interpreted to the matters shown in the drawings.

FIG. 1 is the sectional view of the optical fiber cable of a preferable exemplary embodiment in accordance with the present invention.

MODE FOR INVENTION

Hereinafter, the present invention is described in detail with reference to the attached drawings.

Before the detailed description, it should be noted that the terms used in the present specification and the claims are not to be limited to their lexical meanings, but are to be interpreted to conform with the technical idea of the present invention under the principle that the inventor can properly define the terms for the best description of the invention made by the inventor.

Therefore, the embodiments and the constitution illustrated in the attached drawings are merely preferable embodiments according to the present invention, and thus they do not express all of the technical idea of the present invention, so that it should be understood that various equivalents and modifications can exist which can replace the embodiments described in the time of the application.

FIG. 1 is a sectional view of the optical fiber cable according an exemplary embodiment of the present invention.

As shown in FIG. 1, the optical fiber cable according to the present invention comprises at least one tensile members (27), optical fiber units (21) including at least one optical fiber cores, at least one buffer tubes (22) surrounding the optical fiber units (21), and a sheath (24) covering the buffer tube (22) and the tensile member (27) to form outer cover.

Said optical fiber unit (21) has at least one optical fiber cores therein.

Here, said optical fiber core(s) transmits the optical signals carrying data. Generally, the core part is made of the silica-glass optical fiber having higher refractive index and the cladding part is made of the silica-glass or polymers having lower refractive index than the core to reflect the optical signals transmitted through the core.

Preferably, the optical fiber core can be coated with high molecular polymer for physical protection of the core and cladding.

Said optical fiber unit (21) can be configured as a loose-type cable in which at least one optical fiber cores are arranged with certain intervals, or as a ribbon-type cable in which at least one optical fiber cores are formed closely in a ribbon-shape.

The optical fiber unit (21) is surrounded by a buffer tube (22) to protect the optical fiber unit (21).

Here, said buffer tube (22) also provides waterproofing function and buffering function against external impact, in addition to the protection of said optical fiber unit (21).

For this purpose, said buffer tube (22) has waterproof and insulation functionalities, and preferably, is made with the high molecular polymers such as polyethylene (PE), polybutylene terephthalate (PBT) or polypropylene (PP).

The optical fiber unit (21) surrounded by the buffer tube (22) may surround the tensile member (27).

The tensile member (27) is to protect the optical fiber unit (21) from bending or other type of deformation of the cable, in addition to the function of being backbone of the cable.

Here, the tensile member (27) can be one of, but not limited to, Kevlar aramid yarn, fiber glass epoxy rod, FRP (Fiber Reinforced Polyethylene), high strength fiber, steel strand, or steel wire, which has both strength and elasticity to a certain degree.

The sheath (24), which forms the exterior and mechanical protective member of the cable, can be made with insulating materials, such as polyethylene, PVC, or olefin series high polymers, or other materials satisfying the technical requirements according to the purpose of use or environment of installation.

Here, a glass fiber layer (23) can be positioned inside the sheath (24) to improve the strength and bending characteristics of the cable.

Or, a metal jacket can be further included inside the sheath (24) to shield the cable against an alien crosstalk caused by a nearby cable or electric/electronic equipments.

The optical fiber cable according to the present invention includes waterproof yarn(s) (31) along with the optical fiber unit(s) (21) inside the buffer tube(s) (22). The waterproof yarn (31) can be produced by applying waterproof powder on yarn, or by processing waterproof powder into threads and twisting or sticking them with yarn, to absorb the moisture infiltrated into the tube.

Therefore, the waterproof yarn (31) must have good water absorbability.

Preferably, the water absorption rate of the water-blocking tape (32) may be 20 g/g or above. Here, the water absorption rate means the water absorbed by one gram of the waterproof yarn.

The water absorption rate of the waterproof yarn is determined by the waterproof powder that is coated. To achieve the water absorption rate of 20 g/g or more, the waterproof powder is preferably one of polyacrylic acid salts, PVA maleic reagent, isobutylene maleic copolymer, polyacrylonitrile copolymer, polyethylene oxide vulcanizates, starch-acrylonitrile copolymer, or starch-acrylic acid graft copolymer, which has high absorption rate and speed.

To improve the water absorption rate of waterproof yarn (31), the thickness of the waterproof yarn (31) should be thick, preferably, 300 deniers or more.

However, the thickness of the waterproof yarn (31) should be not greater than 3,000 denier, otherwise, it is difficult to insert the waterproof yarn into the buffer tube (22) longitudinally.

For information purpose, the denier is an international unit designating the thickness of fibers, where 1 deniers fiber is 0.05 g of weight for 450 m of length.

To this end, the thickness of the waterproof yarn is formed to be in a range between 300 and 3,000 denier.

The waterproof yarn (31) may be broken by the tensile stress at the manufacturing process of application in the buffer tube or at the cable bending to a certain radius of bending, for example, during cable laying or winding on a cable drum, and breaking of the waterproof yarn (31) may deteriorates waterproof performance of the cable.

In addition, if the waterproof yarn (31) placed in the buffer tube (22) longitudinally contacts directly with the optical fiber unit (21), the breaking of the waterproof yarn (31) may result in the interference with the optical fiber unit (21) and consequential optical loss.

To solve this problem, the waterproof yarn (31) is preferable to have certain degree of tensile strength and elongation rate.

Here, the tensile strength of the waterproof yarn (31) should be 3N or more to endure tensile stress.

In addition, while the tensile strength of the waterproof yarn (31) is preferable to be higher, the thickness of the waterproof yarn (31) has to be increased to increase the strength. Considering the applicability in the manufacturing process, the thickness of the waterproof yarn (31) is determined so that the tensile strength is 150N or less. Therefore, the tensile strength of the waterproof yarn should be in a range between 3N and 150N.

In addition, the optical fiber cable in accordance with the present invention can further include waterproof members to protect the cable from moisture or other foreign matters, for example, between the tensile member and the tube(s) or the core sets and sheath.

The waterproof members can be waterproof yarn or water-blocking tape.

The water-blocking tape (32) can be non-woven fabrics coated with water absorptive powder and may be positioned in the glass fiber (23) or sheath (24).

The exemplary embodiment of the present invention and Comparative embodiments are set forth and described hereinbelow, referring to the Table 1.

TABLE 1

| | | Embodiment 1 | Embodiment 2 | Embodiment 3 | Embodiment 4 | Embodiment 5 | Comparative embodiment 1 | Comparative embodiment 2 | Comparative embodiment 3 | Comparative embodiment 4 |
|---|---|---|---|---|---|---|---|---|---|---|
| Waterproof yarn | Thickness (den) | 300 | 1000 | 3000 | 1000 | 1000 | 1000 | 250 | 1000 | 1000 |
| | Tensile Strength (kgf) | 5.2 | 11.64 | 25.67 | 28.60 | 11.64 | 11.64 | 11.64 | 2.8 | 11.64 |
| | Elongation rate (%) | 11.25 | 7.50 | 11.25 | 23.17 | 11.25 | 30.10 | 11.25 | 11.25 | 11.25 |
| | Shrinkage Rate (%) | 10.5 | 11.5 | 13.5 | 13.5 | 15.0 | 10.5 | 13.5 | 11.5 | 18.2 |
| | Water Absorption Rate (g/g) | 102.08 | 102.08 | 102.08 | 102.08 | 102.08 | 102.08 | 102.08 | 102.08 | 102.08 |
| Evaluation | Core Breaking | OK | OK | OK | OK | OK | OK | OK | Broken | OK |
| | Water-tightness | No leakage | No leakage | No leakage | No leakage | No leakage | Leak | Leak | Leak | No leakage |
| | Optical Loss (dB) | 0.001 | 0.002 | 0.003 | 0.003 | 0.005 | 0.03 | 0.003 | 0.002 | 0.010 |

Here, the elongation of the waterproof yarn (31) should be determined to endure the bending or tension of the cable within the range of the tensile strength of the waterproof yarn (31), in order to maintain waterproofing function without breaking.

To this end, the appropriate elongation rate of the waterproof yarn (31) should be in a range between 5% and 25%. If the elongation rate is too high, the waterproof yarn which was excessively extended in the manufacturing process may exert stress on the optical fibers, resulting in optical loss, when the yarn returns to its original length.

The waterproof yarn (31) made of a high polymer material is sensitive to temperature change.

In particular, waterproof yarn (31) made of high polymer is easily extended or shrank in the longitudinal axis according to the temperature change.

The thermal expansion or shrinkage of the waterproof yarn, laid longitudinally in or wound laterally on the optical fiber unit, may interfere with the optical fiber unit which can cause optical loss.

Here, the characteristic of the thermal expansion or shrinkage is expressed with the physical property of shrinkage rate which is defined by the ratio of longitudinal deformation of material per unit length and unit temperature change.

Therefore, the shrinkage rate of the waterproof yarn (31) has to be limited to reduce the optical loss in the optical fiber unit (21), preferably, by 15% or less.

Preferably, lip cords (37) can be applied for easy breaking of the sheath (24) for the convenience of cable installation work.

The First Exemplary Embodiment

The first exemplary optical fiber cable according to the present invention comprises the tensile member (27) at the center of the cable, and the buffer tube (22) covers the optical fiber units (21) including the optical fiber cores (21), and waterproof yarn (31) is inserted into the buffer tube (22) longitudinally.

In the embodiment, six buffer tubes having waterproof yarn (31) inside, in longitudinal direction, are twisted in S-Z formation centering at the tensile member (27) to form the core set.

The core set is wrapped with the water-blocking tape (32), and covered with the sheath (24) which forms the exterior member of the cable.

Here, the water absorption rate of the waterproof yarn (31) is 102.08 g/g, thickness is 300 deniers and the tensile strength is 5.2 N.

In addition, the elongation and shrinkage rate of the waterproof yarn (31) is 11.25% and 10.5%, respectively.

The Second Exemplary Embodiment

The second exemplary optical fiber cable according to the present invention has the same configuration as that of the first exemplary embodiment except the waterproof yarn (31).

Here, the water absorption rate of the waterproof yarn (31) of the second exemplary optical fiber cable is 102.08%/g (20 g/g or above), thickness is 1000 deniers and the tensile strength is 11.64 N.

In addition, the elongation and shrinkage rate of the waterproof yarn (31) is 7.5% and 11.5%, respectively.

The Third Exemplary Embodiment

The third exemplary optical fiber cable according to the present invention has the same configuration as that of the first exemplary embodiment except the waterproof yarn (31).

Here, the water absorption rate of the waterproof yarn (31) of the third exemplary optical fiber cable is 102.08%/g (20 g/g or above), thickness is 3000 deniers and the tensile strength is 25.67 N.

In addition, the elongation and shrinkage rate of the waterproof yarn (31) is 11.25% and 13.5%, respectively.

The Fourth Exemplary Embodiment

The fourth exemplary optical fiber cable according to the present invention has the same configuration as that of the first exemplary embodiment except the waterproof yarn (31).

Here, the water absorption rate of the waterproof yarn (31) of the fourth exemplary optical fiber cable is 102.08%/g (20 g/g or above), thickness is 1000 deniers and the tensile strength is 28.60 N.

In addition, the elongation and shrinkage rate of the waterproof yarn (31) is 23.17% and 13.5%, respectively.

The Fifth Exemplary Embodiment

The fifth exemplary optical fiber cable according to the present invention has the same configuration as that of the first exemplary embodiment except the waterproof yarn (31).

Here, the water absorption rate of the waterproof yarn (31) of the fifth exemplary optical fiber cable is 102.08%/g (20 g/g or above), thickness is 1000 deniers and the tensile strength is 11.64 N.

In addition, the elongation and shrinkage rate of the waterproof yarn (31) is 11.25% and 15%, respectively.

Comparative Embodiment 1

The optical fiber cable according to the first Comparative embodiment has the same configuration as that of the first exemplary embodiment except the waterproof yarn (31).

Here, the water absorption rate of the waterproof yarn (1) of the first Comparative embodiment is 102.08%/g, thickness is 1,000 deniers and the tensile strength is 11.64 N.

In addition, the elongation of the waterproof yarn is 30.10% which is higher than the 25% which is the maximum range of the present invention and the shrinkage rate is 10.5%.

Comparative Embodiment 2

The optical fiber cable according to the second Comparative embodiment has the same configuration as that of the first exemplary embodiment except the waterproof yarn (31).

Here, the water absorption rate of the waterproof yarn (2) of the second Comparative embodiment is 102.08%/g, thickness is 250 deniers which is less than the 300 deniers which is the minimum thickness of the present invention, and the tensile strength is 11.64 N. In addition, the elongation and shrinkage rate of the waterproof yarn (31) is 11.25% and 13.5%, respectively.

Comparative Embodiment 3

The optical fiber cable according to the third Comparative embodiment has the same configuration as that of the first exemplary embodiment except the waterproof yarn (31).

Here, the water absorption rate of the waterproof yarn (3) of the third Comparative embodiment is 102.08%/g, thickness is 1000 deniers, and the tensile strength is 2.8 N which is lower than the minimum of 3 N.

In addition, the elongation and shrinkage rate of the waterproof yarn (31) is 11.25% and 11.5%, respectively.

Comparative Embodiment 4

The optical fiber cable according to the fourth Comparative embodiment has the same configuration as that of the first exemplary embodiment except the waterproof yarn (31).

Here, the water absorption rate of the waterproof yarn (4) of the first Comparative embodiment is 102.08%/g, thickness is 1,000 deniers and the tensile strength is 11.64 N.

In addition, the elongation and shrinkage rate of the waterproof yarn (31) is 11.25% and 18.25% which exceeds the maximum of the present invention.

Evaluation

For the comparative evaluation of the embodiments with the Comparative embodiments, the possibility of the breaking of the waterproof yarn when the yarn is being assembled in the buffer tube longitudinally was tested. For the waterproof performance test, water penetration length test was conducted in accordance with IEC60794-1-2 F5, where the water head was 1 m and the sample cable was 3 m long, having the same structure and diameter, except the inner part of the tube. The pass/fail criterion of the test was whether water leaks out of the cable end, or not. The optical loss was measured with the difference between the average of the measurements before and after forming the tube.

The cables of the exemplary embodiments, from the first to the fifth, showed no breaking of the waterproof yarn and satisfactory waterproof performance and optical loss characteristics.

On the other hand, the cable of the first Comparative embodiment, having high elongation of 30.10% rendered leakage in the water penetration length test, and high optical loss of 0.03 dB which was thought to be caused by the shrinkage of the waterproof yarn which was extended in the manufacturing process due to the high elongation, giving stress to the optical fibers. The cable of the second Comparative embodiment showed water leakage due to too small yarn thickness. The cable of the third Comparative embodiment showed breakage in the process of assembling the waterproof yarn in the buffer tube, and water leakage in the water penetration length test. The cable of the fourth Comparative embodiment showed very high optical loss of 0.01 dB, which was thought to be caused by the influence of the thermal deformation of the waterproof yarn on the optical fiber unit.

While it is apparent that the illustrative embodiments of the invention herein disclose fulfills the objective stated above, it will be appreciated that numerous modifications and other embodiments may be devised by those skilled in the art. Therefore, it will be understood that the appended claims are intended to cover all such modifications and embodiments which come within the spirit and scope of the present invention.

Therefore, various modifications will be able to be applied to the optical fiber unit, buffer tube, waterproof yarn, metal jacket, and/or sheath of the present invention, and their numbers are not limited to those in the exemplary embodiments set forth and described hereinabove. Furthermore, the structure and components and parts of the optical fiber cable in accordance with the present invention are not limited to the structures and components and parts set forth and described hereinabove, but can be implemented in diversely modified structures and/or components and parts, as appropriate for the specific purpose of the optical fiber cable.

Although the present invention has been described with reference to the specified examples in the above, but the idea of the present invention is not limited to the above described matters and various changes and modifications can be made within the equivalent scope of the present invention and the following claims by the ordinary-skilled person of the art.

What is claimed is:

1. An optical fiber cable with improved waterproof performance comprising:
    at least one tensile members;
    optical fiber units including at least one optical fiber cores;
    at least one buffer tube surrounding the optical fiber units;
    sheath covering the buffer tube and the tensile member to form a outer jacket of the cable, wherein
    a waterproof yarn is inserted longitudinally in the buffer tube with the optical fiber unit, and the thickness of the waterproof yarn is from 300 to 3,000 deniers, and tensile strength of the waterproof yarn is from 3 N to 150 N, and elongation rate of the waterproof yarn is from 5% to 45%, and water absorption rate of the waterproof yarn is at least 20 g/g.

2. The optical fiber cable with improved waterproof performance according to the claim 1, wherein
    the shrinkage rate of the waterproof yarn is 15% or less.

3. The optical fiber cable with improved waterproof performance according to the claim 2, wherein
    the waterproof yarn is produced by applying waterproof powder on yarn, or by processing waterproof powder into threads and twisting them with yarn, and the waterproof powder can be one of polyacrylic acid salt series, PVA maleic reagents, isobutylene maleic copolymers, polyacrylonitrile copolymers, polyethylene oxide vulcanizates, starch-acrylonitrile copolymer, or starch-acrylic acid graft copolymers.

4. The optical fiber cable with improved waterproof performance according to the claim 1, wherein
    the optical fiber cable further includes a glass fiber in the sheath.

5. The optical fiber cable with improved waterproof performance according to the claim 1, wherein
    waterproof yarn is additionally positioned on outer side of the tensile member.

6. The optical fiber cable with improved waterproof performance according to the claim 1, wherein
    the optical fiber cable further includes water-blocking tape on the outside of the buffer tube.

7. The optical fiber cable with improved waterproof performance according to the claim 1, wherein
    the optical fiber cable further includes metal jacket in the sheath.

8. The optical fiber cable with improved waterproof performance according to the claim 7, wherein
    waterproof yarn is additionally positioned on the outer side of the metal jacket.

9. The optical fiber cable with improved waterproof performance according to the claim 1, wherein
    the sheath is divided into the first sheath and the second sheath, and waterproof yarn is additionally positioned between the first sheath and the second sheath.

10. The optical fiber cable with improved waterproof performance according to the claim 9, wherein
    reinforcement tape is further included between the first sheath and the second sheath.

* * * * *